United States Patent [19]

Tussing

[11] Patent Number: 5,275,349
[45] Date of Patent: Jan. 4, 1994

[54] CART FOR SPOOLS OF WIRE

[76] Inventor: Norman P. Tussing, 1365 SE. 10th, Warrenton, Oreg. 97146

[21] Appl. No.: 916,028

[22] Filed: Jul. 17, 1992

Related U.S. Application Data

[63] Continuation-in-part of Ser. No. 634,038, Dec. 26, 1990, abandoned.

[51] Int. Cl.⁵ .............................................. B65H 17/40
[52] U.S. Cl. .......................... 242/86.50 R; 280/47.35
[58] Field of Search ............... 242/86.5 R; 86.2, 117, 280/62, 47.35, 280/79.11; 403/382, 403, 205

[56] References Cited

U.S. PATENT DOCUMENTS

| | | | |
|---|---|---|---|
| 828,562 | 8/1906 | Melven | 242/86.2 |
| 1,214,772 | 2/1917 | Fouts | 242/86.5 R |
| 2,229,787 | 1/1941 | Abbott | 242/86.5 R |
| 2,588,529 | 3/1952 | Hume | 242/139 |
| 2,705,114 | 3/1955 | Worsham | 242/86.5 R |
| 3,178,129 | 4/1965 | Parkinson | 242/129 |
| 3,388,806 | 6/1968 | Cunningham et al. | 211/13 |
| 3,764,031 | 10/1973 | Parsen | 242/86.5 R |
| 3,902,679 | 9/1975 | Bost | 242/129 |
| 4,564,152 | 1/1986 | Herriage | 242/86.5 R |
| 4,611,645 | 9/1986 | Whisnant | 242/86.5 R |
| 4,901,937 | 2/1990 | Mendoza | 242/86.5 R |

FOREIGN PATENT DOCUMENTS

| | | | |
|---|---|---|---|
| 259454 | 10/1968 | Austria | 280/47.35 |
| 0337786 | 10/1989 | European Pat. Off. | 242/86.5 R |
| 2015356 | 11/1971 | Fed. Rep. of Germany | 280/62 |
| 1261914 | 4/1961 | France | 280/62 |

*Primary Examiner*—Daniel P. Stodola
*Assistant Examiner*—John Rollins
*Attorney, Agent, or Firm*—James D. Givnan, Jr.

[57] ABSTRACT

A cart for transporting wire spools at a job site and having a tee shaped frame with a three wheel undercarriage. A spool support includes a post with arms on which wire spools are rotatably carried. A housing at the post lower end slidably receives a longitudinal frame member while a transverse frame member is secured to the housing, and to the longitudinal frame member, by a single removable fastener assembly enabling convenient disassembly of the cart. A sleeve on the post serves to support, along with an eye in place on a cart handle, a rod on which a large diameter wire spool may be rotatably supported.

1 Claim, 1 Drawing Sheet

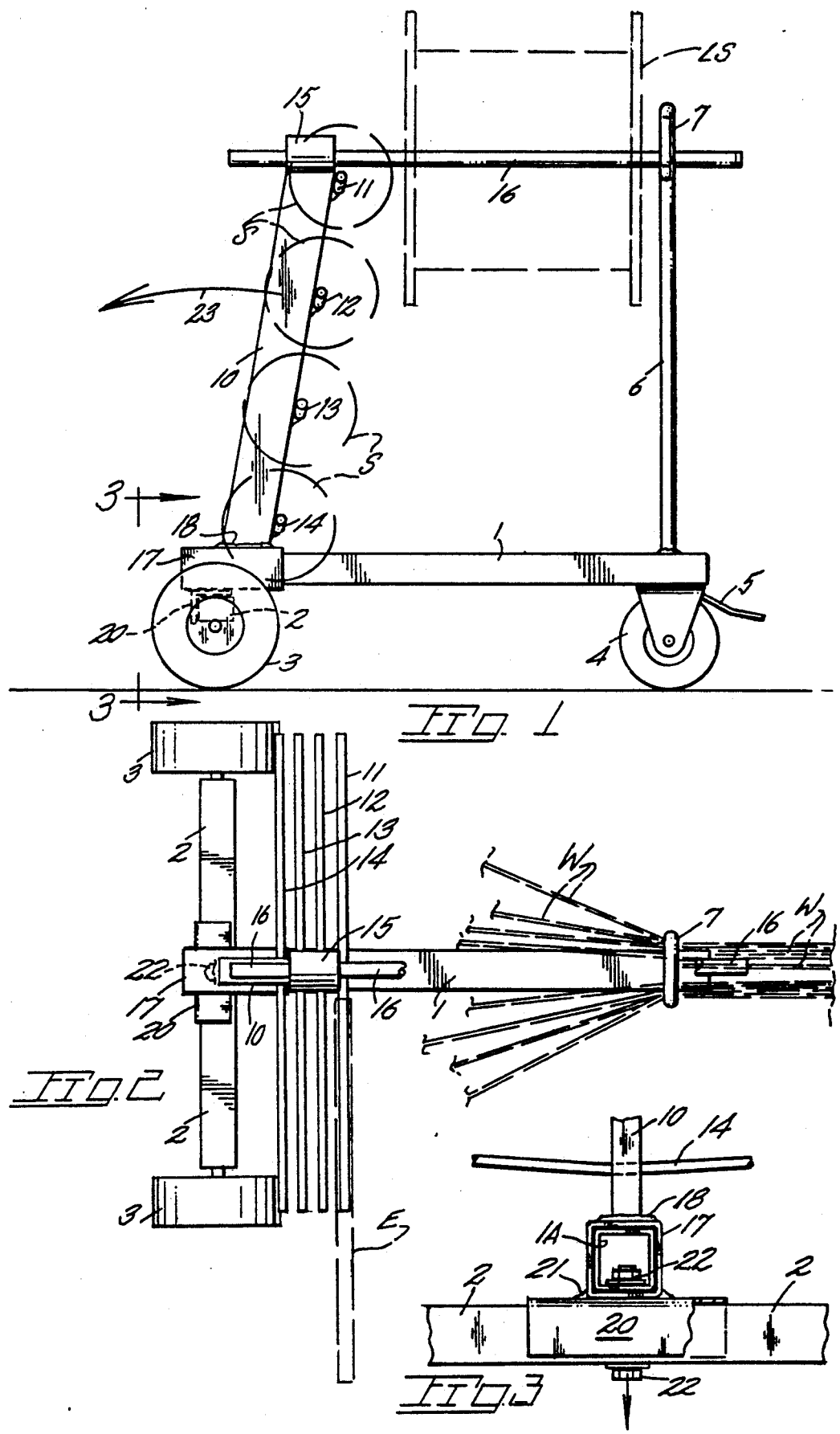

CART FOR SPOOLS OF WIRE

BACKGROUND OF THE INVENTION

This is a continuation-in-part of application 07/634,038 filed Dec. 26, 1990 and now abandoned.

The present invention pertains generally to carts on which a number of wire spools may be rotatably supported for use at a wiring job site.

It is common practice by electricians to install electrical wiring by the forming of a bundle or grouping of wires for installation into a protective conduit. In doing this it is common practice to install a number of wire spools on a cart or platform rotatable to permit paying out of the wire as it is inserted into the conduit. In the prior art are a number of movable platforms or carts for the transport of a plurarity of wire spools.

A shortcoming of the prior art is that the same are not highly maneuverable or of a size to permit passage through restricted passageways of a building as for example room doorways. A further disadvantage of known platforms or carts is that they are difficult and bulky in construction to prevent convenient transfer from job site to job site but rather require a large truck and loading personnel or equipment for such transfer. Additionally known carts have a serious restriction as to the number of wire reels that may be transported as well as a lack of provision for transporting large wire spools.

In the prior art U.S. Pat. No. 3,178,129 shows multiple reels supported on their vertical axes. Each reel includes a reel turntable. U.S. Pat. No. 3,388,806 discloses a cart equipped with caster-type wheels with an upright superstructure equipped with inclined arms for the reception of spools of textile yarn. U.S. Pat. No. 3,902,679 shows a wire supporting cart wherein the wire is routed through an eye located above the uppermost wire spool. U.S. Pat. No. 2,588,529 shows a rack for floor placement having a multitude of spindles on which spools are rotatably supported. The rack may be reconfigured for purposes of compact storage.

SUMMARY OF THE PRESENT INVENTION

The present invention is embodied within a highly maneuverable wire cart of knockdown construction capable of transporting a wide range and number of wire spools.

The present cart includes a tee shaped frame in plan view having a longitudinal and a transverse member with a spool support assembly thereon. A removable fastener assembly extends through and serves to couple the above noted cart components to one another. The cart frame is supported by the tricycle-like wheel arrangement including a caster. The spool support assembly provides a post on which a number of spool receiving arms are carried. The post is also provided with a sleeve in which is rotatably received a spool mandrel which is jointly supported by an upright cart handle having a mandrel receiving eye. The mandrel carries a large wire spool up to two or three feet in diameter for transporting as well as paying out of the wire.

Important objectives include the provision of a wire spool cart capable of supporting a large number of wire spools of various sizes including large diameter spools at a job site to effect a reduction in the electrician's time in performing a wiring job; the provision of a wire cart of knockdown construction with components joined by a single removable fastener assembly to facilitate movement from one job site to another; the provision of a wire cart lending itself to both manufacture and shipping at low cost.

BRIEF DESCRIPTION OF THE DRAWINGS

FIG. 1 is a side elevational view of the present wire cart;

FIG. 2 is a plan view of FIG. 2; and

FIG. 3 is an elevational view taken along line 3—3 of FIG. 1.

DETAILED DESCRIPTION OF THE PREFERRED EMBODIMENTS

With continuing attention to the drawings wherein applied reference numerals indicate parts similarly hereinafter identified, the reference numeral 1 indicates a longitudinal member of a cart frame which frame is of tee shape in top plan view.

A transverse member at 2 of the frame is equipped at its ends with wheels 3 while the forward end of longitudinal member 1 is supported by a wheel 4 of the caster type. A lock 5 is settable to prevent wheel rotation during a wiring installation. The tricycle-type wheel arrangement provides for high maneuverability of the cart as well as a brake for the cart.

At the forward end of longitudinal member 1 is an upright handle 6 which terminates upwardly in an eye 7.

A spool support assembly includes a post 10 which has vertically spaced horizontal arms 11, 12, 13 and 14 which project laterally from the post to receive wire spools S. The post terminates upwardly in a sleeve 15 for inserted reception of a mandrel 16. Mandrel 16 projects forwardly through eye 7 to provide a horizontal support or mandrel for a large wire spool indicated at LS. Wires at W also pass through eye 7.

The spool support assembly additionally includes a housing 17 secured as by welding 18 to the lower end of post 10 with the housing being of tubular shape to receive the inserted rearward end 1A of longitudinal member 1. A bracket at 20 is embodied in an angular plate in place on post 10 and specifically housing 17 and a horizontal flange of bracket 20, prevents horizontal angular displacement of transverse member 2 by providing an abutment for the transverse member. Angular bracket 20 is secured by welds 21 to the underside of housing 17.

A fastener assembly 22 extends through transverse frame member 2, housing 17 and partially through the end segment of longitudinal member 1 to couple same in place. The disassembly of the cart into primary components i.e., the frame assembly and the spool support assembly is conveniently achieved by removal of fastener assembly 22 in the direction of the arrow in FIG. 3.

In use the spools S are installed on the arms 11-14 and may vary in diameter to best suit the wiring job being accomplished. While the spools S are shown as being of one size, in actual practice a wide range of spool diameters and wire sizes are used in a typical wiring job. In those instances where a large spool such as that indicated at LS must be transported into place at a job such alternative use of the cart is accomplished by the tipping of the cart rearward so as to be supported by rear wheels 3 and sleeve 15 which permits the positioning of a large spool into axial alignment with the sleeve and with eye 7 to enable insertion of mandrel 16 therethrough. Subsequently, the cart is returned to its normal position shown in FIG. 1 for travel to a desired location whereat wire is pulled off spool LS without passage through eye 7. At the completion of a wiring job at a site the present cart is disassembled by downward removal of fastener assembly 22 to permit compact stowage of the components of the cart within a small truck or auto trunk. During the paying out of wire from the spools S, through eye 7 (spool LS being removed) caster wheel 4 is locked against rotation by brake 5 to assure that the cart remains immobile.

Arrow 23 indicates the direction of travel of post 10 towards placement on a floor surface at F for purposes of loading a large spool on mandrel 16.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

1. A cart for the transport and dispensing of electrical wire from spools or alternatively from a single large spool, said cart comprising, a frame of tee shape and including a horizontal longitudinal member and a horizontal transverse member at one end of said longitudinal member, ground engaging wheels supporting the longitudinal member and the transverse member, one of said wheels being a caster wheel supporting said longitudinal member, an upright handle at one end of said longitudinal member, a wire guide at the upper end of said handle, a spool support assembly including an upright post having an upper end and a lower end, laterally projecting arms on said post for spool reception, a housing carried by the lower end of said post for inserted reception of one end of said longitudinal member, an angular plate carried by and depending from said housing and in abutment with said transverse member, a sleeve affixed to the upper end of said post, a mandrel inserted into said wire guide and said sleeve for reception of a spool, a removable fastener assembly extending through said transverse member and into said housing and into said longitudinal member to couple all of same to one another in detachable fashion to facilitate disassembly and subsequent transport of the disassembled cart from job site to job site, said angular plate in abutment with said transverse member when the cart is assembled to confine the transverse member against angular displacement about said fastener assembly.

* * * * *